July 21, 1942. W. J. CRITES 2,290,408
EXPLORATION OF BORE HOLES
Filed Feb. 21, 1941
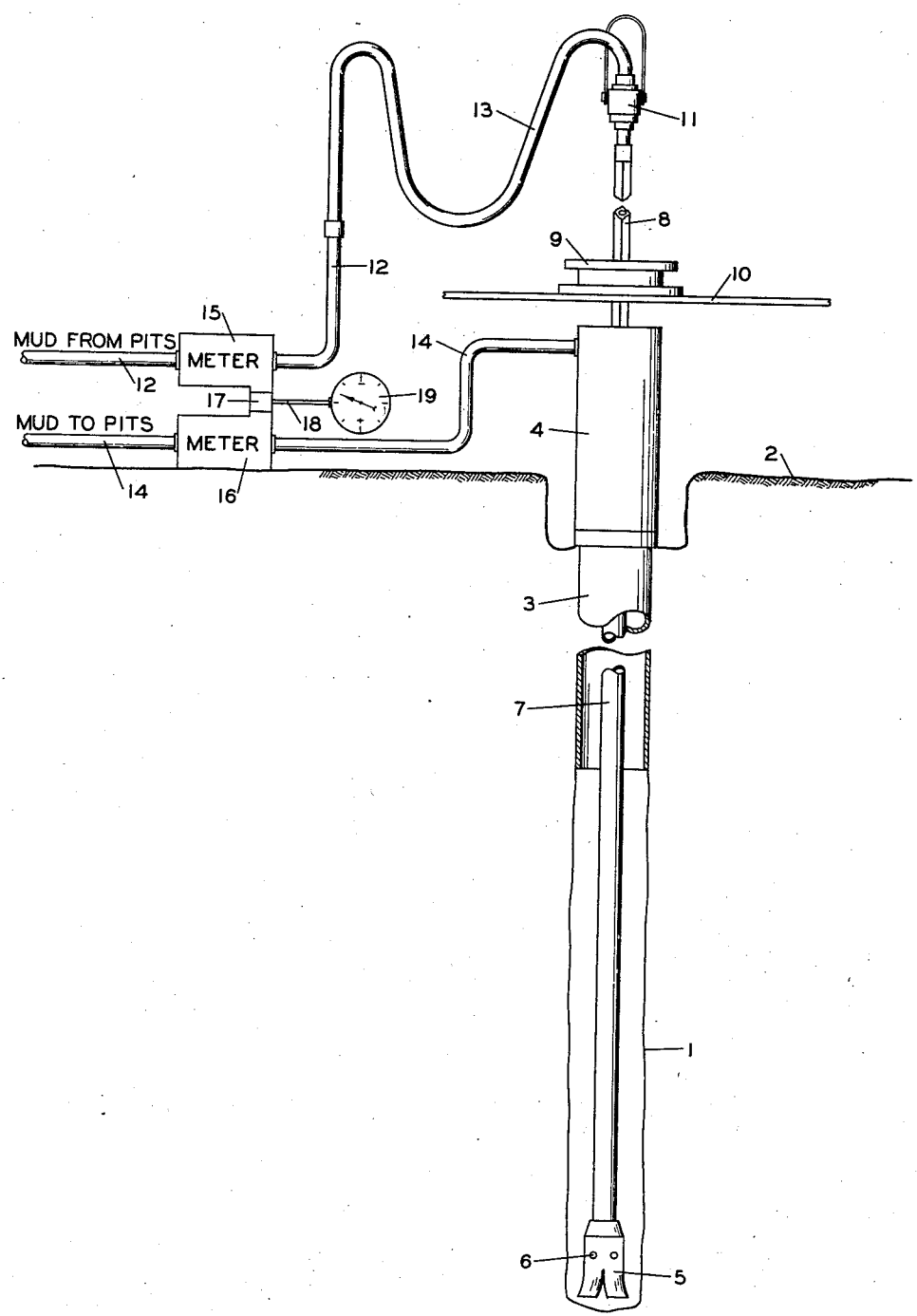
INVENTOR
W. J. CRITES
BY
Hudson, Young, Shouley & Yinger
ATTORNEY Patented July 21, 1942

2,290,408

UNITED STATES PATENT OFFICE 2,290,408

EXPLORATION OF BOREHOLES

Wilbur J. Crites, Bartlesville, Okla., assignor to Phillips Petroleum Company, a corporation of Delaware Application February 21, 1941, Serial No. 380,046

6 Claims. (Cl. 255—1)

This invention relates to drilling and more particularly to a method and apparatus for locating various types of underground formations, including porous and fluid-bearing types.

In the drilling of hydrocarbon oil and gas wells by the method commonly known as the rotary system, it is common practice to circulate a drilling fluid or mud for lubricating and cooling the drill bit, for carrying away the small particles of rock that are cut from the formations penetrated by the bit, and for building up a mud sheath on the wall of the bore hole. The mud sheath prevents caving of the uncased portions of the bore hole and prevents the flow of drilling fluid from the bore hole to the formation or the flow of formation fluid from the formation to the well bore. Another important function of the drilling mud is to maintain a fluid column of sufficient weight and consistency to control any fluid pressures that may be encountered in underground formations.

It is significant that the amount of drilling fluid required to build a mud sheath on the wall of the bore hole is dependent upon the porosity of the formation penetrated, and to a great extent upon its permeability. In a broad sense, strata of rock within the productive limits of an oil or gas reservoir will have relatively uniform characteristics of porosity and permeability. Another important characteristic of a formation is the gas content of that particular strata. With present methods of rotary drilling, the attendant is usually unable to ascertain from his mud and formation samples any indication of gas in a rock strata until considerable time has lapsed. This lag in time is that required for the drilling fluid to circulate from the bottom of the bore hole to the surface of the ground.

Under ordinary drilling conditions, the discharge volume of the drilling fluid in the mud circulating system rarely equals the intake volume. This differential of volume is caused by several factors, which combine to make the discharge volume greater or less than the intake volume. Part of the drilling mud is deposited on the wall of the bore hole forming a mud sheath. The amount of fluid used for this purpose varies with the type of formation being drilled, as porous formations require more fluid to form a satisfactory mud sheath than the denser, less porous types. Part of the drilling fluid fills the newly-formed bore hole as the bit drills ahead. This loss is partly made up by the formation cuttings and fluid from that portion of the bore hole which become entrained with the drilling fluid. For a given rate of bit penetration and drilling fluid circulation, and for a relatively uniform type of formation, the differential volume will be practically constant.

If a gas or liquid-bearing zone is penetrated, and if the pressure of the fluid therein is equal to or greater than the pressure of the circulating drilling fluid column, fluid from the formation will flow into the bore hole in the proximity of the bit where it will become entrained with the drilling fluid to increase the discharge volume. If the penetrated zone contains gas of sufficient volume and pressure, the gas will enter the drilling fluid in small bubbles, which will lessen the specific gravity of that part of the circulating column which is being discharged from the bore hole. If this condition is allowed to continue, the weight of the column of fluid will become insufficient to control the gas pressure in the formation, and the drilling fluid, and possibly the rotary drill pipe, may be blown from the bore hole. With present drilling methods, blow-outs are not usually detected until the column of drilling fluid is too light in weight to control the formation pressure.

On the other hand, when a highly porous and permeable formation which has a lower formation pressure than the head of the drilling fluid is penetrated by the bit, appreciable quantities of drilling fluid will filtrate into the formation. With this inflow, the drilling fluid may not be discharged from the circulating system of the rotary drilling apparatus in sufficient quantities to carry out the formation cuttings which will then settle downwardly in the well bore and collect around the bit, causing the drill stem to twist off, or the loss of drilling fluid will be so great that drilling operations will be interrupted.

If continuous comparison of the intake and discharge drilling mud volumes can be obtained, the attendant can quickly ascertain whether formation fluid is flowing from the formation to the well bore or whether drilling fluid is filtrating into the formation. By continuously combining the comparison of drilling mud volumes with the depth of the bore hole, a log of the fluid-bearing porous and non-porous formations can be obtained. Such a log would be useful in the drilling of other wells. The correlation of a number of logs of this type will be very useful in planning a program of development and exploitation for the productive area of a particular formation.

My instant invention proposes a method and apparatus for measuring the intake and discharge volumes of the drilling fluid circulated during rotary drilling operations. The invention consists essentially of two meters, one each on the intake and the discharge drilling mud line. The meters are connected to a differentiating mechanism, which in turn connects to an indicating register that shows or records any differential volume between the intake and discharge lines. My invention detects the entrainment of formation fluid in the mud column in sufficient time to allow the attendant of the rotary drilling system to condition his mud and take over precautionary measures which will prevent the occurrence of blow-outs. By the practice of my instant invention, the "loss of circulation" can also be detected in sufficient time to allow the attendant to condition his drilling fluid in such a manner as to prevent the objectionable loss of fluid to the formation. By continuously combining a record of differential volume of drilling fluid between the intake and discharge lines with a record of the bore hole depth, a log of the penetrated formations can be obtained.

My invention has for its primary object the provision of a method and apparatus for locating underground formations, including porous and fluid-bearing formations.

Another object of my invention is the provision of a method and apparatus for detecting conditions indicating the flow of fluid from a formation to a bore hole and the entrainment of the formation fluid with the drilling fluid.

A further object of my invention is the provision of a method and apparatus for detecting conditions indicating the flow of drilling fluid from the bore hole into a formation.

These and additional objects and advantages will be apparent to persons skilled in the art by reference to the following description and annexed drawing which is an elevation view of a preferred embodiment of my invention showing a drilling fluid circulating system and as much of the rotary drilling equipment as is needed to accurately describe my apparatus and its mode of operation.

Referring to the drawing, I have shown a bore hole, designated by numeral 1, which is cased below the surface of the ground 2 by a string of casing 3. Blow-out prevention equipment 4 is secured to the casing in the usual manner. A bit 5 having ports 6 is secured at the bottom of a hollow drill stem 7 which is rotated through the cooperation of a square upper member or "kelly joint" 8 and a rotary table 9. The rotary table is supported on a derrick substructure 10 and is powered in the usual manner by a rotary draw works (not shown). A rotary swivel 11 is secured to the upper end of "kellyjoint" 8 and is suspended above the rotary table in a manner common to the art. An intake conduit 12, through which clean drilling fluid is pumped from slush pits (not shown) is connected to swivel 11 by a rotary hose 13. A discharge conduit 14 connects with blow-out prevention apparatus 4 and returns drilling fluid with entrained cuttings to the slush pits. A meter 15 in conduit 12 and a second meter 16 in conduit 14 are connected to each other by any well known differentiating mechanism 17, such as a differential gear assembly, which will cooperate with a suitable shaft 18 to indicate differential readings of the two meters on an indicator 19. While this embodiment shows a simple indicating register, it is obvious that a recording type indicator could be used, if desired. If it is used in conjunction with a depth recorder, a permanent log of changes in the differential volume between the intake and discharge lines can be obtained for the entire depth of the bore hole. The proper interpretation of these differentials would result in a log of all fluid-bearing, porous, and non-porous formations.

In the operation of my invention, I have chosen to show its relationship to the drilling of hydrocarbon oil and gas wells. It is to be understood that this is not its only application. In the illustrated embodiment, clean drilling fluid is pumped from the slush pits into conduit 12 where the volume passing therethrough is measured by meter 15. The fluid flows through conduit 12, rotary hose 13, swivel 11, kelly 8, and thence downwardly through drill pipe 7. This fluid is emitted from the drill stem through ports 6 of bit 5 where it lubricates and cools the bit and begins its travel upwardly through the annular space between the drill stem 7 and the wall of bore hole 1 and casing 3, leaving the annular space at the blow-out prevention equipment 4 where it is returned to the slush pit through conduit 14. The discharge volume is measured by meter 16. As the drilling fluid is being circulated in the above described manner, bit 5 and drill pipe 7 are being rotated through the cooperation of kelly 8 and the rotary table 9 which is driven in the usual manner by rotary draw works. As meters 15 and 16 are connected to the differentiating mechanism 17, it is obvious that the reading of indicator 19 will be relative with respect to the volumes of drilling fluid passing through conduits 12 and 14. Mechanism 17 is so arranged that when the volumes of fluid in lines 12 and 14 are equal, there will be a zero reading on indicator 19. When the discharge volume is greater than the intake volume, the reading on indicator 19 will be positive; when less, negative. Although the volume of fluid transmitted through the intake line is seldom equal to the volume flowing through the discharge line, it is desirable that indicator 19 be calibrated to read a zero differential when equal volumes flow through the two lines. Thus, all differentials of volume will carry a significance which will be useful in interpreting the readings of the indicator. Extreme differentials will be indicative of fluid flowing from the formation to the bore hole or from the bore hole to the formation in amounts sufficient to be undesirable or dangerous to drilling operations.

If a high pressure fluid-bearing formation is penetrated by bit 5, this fluid will be entrained with the drilling fluid and will increase its discharge volume. Indicator 19 will show this increase in a positive manner almost immediately after the fluid-bearing zone has been penetrated. If the differential is large, indicating a zone of considerable high pressure fluid, the attendant may condition his mud in sufficient time to prevent the occurrence of a blow-out. Similarly, the loss of drilling fluid to the formation will be shown in a negative manner on indicator 19 and the attendant may take necessary steps to prevent a continued loss of circulation.

It will be noted that the above description contemplates the practice of my invention by transmitting drilling fluid downwardly through hollow drill stem 7, outwardly through ports 6, and thence upwardly through the annular space between drill stem 7 and casing 3. It will be obvious that the drilling fluid may be circulated in a reverse manner with equally satisfactory results for the purposes of my invention by transmitting the drilling fluid from the slush pits through conduit 14, downwardly through the annular space between casing 3 and drill stem 7, inwardly through ports 6 in drill 5, upwardly through drill stem 7, and then back to the slush pits by way of hose 13 and conduit 12. Indicator 19 may be readily adjusted to properly indicate differential flow through meters 15 and 16 under reverse circulation conditions.

From the foregoing, it is believed that the method and apparatus for practicing my instant invention will be readily comprehended by persons skilled in the art. It is to be clearly understood, however, that various changes in the apparatus herewith shown and described and in the method of practicing the invention, outlined above, may be resorted to without departing from the spirit of the invention as defined by the appended claims.

I claim:

1. In apparatus for exploring a well bore while drilling a well, the combination comprising means for circulating drilling fluid through the well bore, and means for indicating variations in the difference between the volume of drilling fluid that is introduced into the well bore and the volume of fluid withdrawn from the well bore.

2. In apparatus of the character described, the combination comprising means for drilling a well bore, means for transmitting drilling fluid downwardly through the well bore and then returning drilling fluid upwardly through the well bore, and means for indicating variations in the difference between the volume of drilling fluid that is transmitted downwardly through the well bore and the volume of fluid that is simultaneously returned upwardly through the well bore.

3. In apparatus of the character described, the combination comprising a conduit; a cutting tool connected to the conduit for drilling a well bore; means for continuously introducing drilling fluid into the well bore, transmitting the drilling fluid downwardly through the well bore to the cutting tool, and then returning drilling fluid to the surface of the ground; and means connected to said means for indicating variations in the difference between the volume of drilling fluid that is introduced into the well bore and the volume of fluid that is simultaneously returned to the surface of the ground.

4. In apparatus of the character described, the combination comprising a hollow drill stem, a cutting tool connected to the lower end of the drill stem for drilling a well bore, a drilling fluid circulation system connected to an input conduit for introducing drilling fluid into the well bore and an output conduit for discharging fluid from the well bore, and means associated with the input and output conduits for indicating variations in the difference between the volume of drilling fluid introduced into the well bore and the volume of fluid that is simultaneously discharged from the well bore.

5. In apparatus of the character described, the combination comprising a hollow drill stem, a cutting tool connected to the lower end of the drill stem for drilling a well bore, a drilling fluid circulation system including a conduit for introducing drilling fluid into the drill stem and a conduit for discharging drilling fluid from the space between the drill stem and the well bore, and means connected to both conduits for indicating variations in the difference between the volume of drilling fluid introduced into the drill stem and the volume of fluid simultaneously discharged from the space between the drill stem and the well bore.

6. In apparatus of the character described, the combination comprising a hollow drill stem, a cutting tool connected to the lower end of the drill stem for drilling a well bore, a drilling fluid circulation system including a conduit for introducing drilling fluid into the space between the drill stem and the well bore and a conduit for discharging drilling fluid from the drill stem, and means connected to both conduits for indicating variations in the difference between the volume of drilling fluid introduced into the space between the drill stem and the well bore and the volume of fluid simultaneously discharged from the drill stem.

WILBUR J. CRITES.